United States Patent [19]

Gurniak

[11] Patent Number: 5,327,647
[45] Date of Patent: Jul. 12, 1994

[54] METHOD FOR SETTING PITCH ON A WINDMILL AIRFOIL

[75] Inventor: Theodore B. Gurniak, Jenkintown, Pa.

[73] Assignee: Energy Unlimited, Villanova, Pa.

[21] Appl. No.: 108,833

[22] Filed: Aug. 18, 1993

Related U.S. Application Data

[63] Continuation of Ser. No. 796,168, Nov. 22, 1991, abandoned.

[51] Int. Cl.⁵ .................. B21K 3/02; B23Q 27/00; B64C 27/80; F03D 11/04
[52] U.S. Cl. .......................... 29/889; 29/407; 29/889.1; 29/889.3; 29/889.6; 29/889.7; 29/901; 415/4.1; 416/61; 416/205; 416/132 B
[58] Field of Search .............. 29/406, 407, 889, 889.1, 29/889.3, 889.5, 889.6, 889.7, 901; 81/484, 487, 488; 415/4.1–4.5; 416/61, 205, 206, 207, 132 B, 223 R; 73/66, 455, 456, 459, 487; 74/572, 573

[56] References Cited

U.S. PATENT DOCUMENTS

| | | | |
|---|---|---|---|
| 2,499,837 | 3/1950 | Sheets et al. | 416/205 |
| 3,231,022 | 1/1966 | Schroeter et al. | 416/205 |
| 3,254,399 | 6/1966 | Zahuranec | 29/407 |
| 4,366,387 | 12/1982 | Carter, Jr. et al. | 416/132 B X |
| 4,379,813 | 4/1983 | Newnham | 416/223 R X |
| 4,856,943 | 8/1989 | Nelson et al. | 29/407 X |
| 4,879,792 | 11/1989 | O'Connor | 29/889 |

FOREIGN PATENT DOCUMENTS

850857 9/1952 Fed. Rep. of Germany ...... 416/205

*Primary Examiner*—Peter Dungba Vo
*Attorney, Agent, or Firm*—Panitch Schwarze Jacobs & Nadel

[57] ABSTRACT

Setting pitch on a windmill airfoil having a longitudinal axis, a rotor blade and a rotor base secured to the rotor blade is accomplished by marking a windmill rotor hub for receiving the rotor base with a reference mark at a location corresponding to a first plane parallel to a plane of rotation of the windmill airfoil in use. The airfoil is positioned along a second plane relative to and substantially completely intersecting the longitudinal axis of the airfoil. The rotor base is marked at a location substantially parallel to the second plane. The airfoil is positioned relative to the windmill rotor hub so that the rotor base is in substantial engagement with the hub. The airfoil is moved relative to the hub so that the mark on the rotor base is aligned with the reference mark on the windmill rotor hub and the rotor base is secured to the windmill hub. An apparatus for marking pitch on a windmill airfoil is also provided.

13 Claims, 4 Drawing Sheets

METHOD FOR SETTING PITCH ON A WINDMILL AIRFOIL

This is a continuation application of Ser. No. 07/796,168, filed Nov. 22, 1991, now abandoned.

BACKGROUND OF THE INVENTION

1. Field of the Invention

The present invention relates to windmill airfoils or rotors and, more particularly, to setting pitch on a windmill airfoil.

2. Description of the Prior Art

Alternative energy sourcing is a popular area of study and practice given the increasing cost and finite reserves of conventional energy sources. Harnessing wind, the realm of the age-old windmill, is one popular alternative energy resource. The technology in windmill apparatus, however, has greatly improved the design and efficiency of older conventional windmills. Typically, modern windmill apparatus comprises two or more windmill rotor blades having aerodynamic characteristics similar to aircraft propellers. Such aerodynamic rotor blades are commonly referred to in the industry as thick airfoils. As in aircraft use, the pitch of the rotor blade (the angle of the blade about its longitudinal axis generally measured at a given chord of the airfoil relative to the air flow direction) determines air flow and, in the case of windmills, the amount of force generated by the air flow. The desired rotor blade pitch of a given windmill is determined by the location of the windmill, expected air flow characteristics, altitude, temperature, season, power or torque desired and speed of rotation desired, among other factors.

Failure to set appropriate pitch generally results in inefficient or even non-operating windmills. For example, a difference of as little as 3.5° pitch can cause a decrease in energy efficiency of over 46% in the same wind environment. Moreover, certain airfoils peak at a given wind speed and efficiency decreases at greater wind speeds. Accordingly, pitch needs to be adjusted to compensate for the higher wind conditions. In addition, all of the rotor blades on one windmill preferably should have identical pitch to optimize performance and efficiency of the windmill and to decrease the potential for overload and instable conditions (commonly referred to as yaw loads) that occur when two or more rotor blades do not have the same pitch.

Rotor blade pitch is conventionally adjusted and set in the field with the windmill apparatus already erected. Methods for setting and adjusting rotor blade pitch on windmills typically comprise holding the rotor blades in close proximity to the rotor hub or fastening point of the windmill, rotating the rotor blade about its longitudinal axis until the desired pitch is achieved and fastening the rotor blade to the rotor hub. Achieving the desired pitch in these prior art methods requires measuring the arc offset from the last known pitch angle and/or eye-bailing the desired pitch from a convenient vantage point. This method often leads to at least slight variations in the pitch angle of the rotor blades on a rotor hub due to the lack of an objective measuring standard. In addition, because windmill rotor blades have diameters from 7 to 20 meters and are relatively heavy, it is usually necessary to suspend the rotor blade by a crane or other lifting apparatus to hold the rotor blade in position until the pitch can be determined and the rotor blade is fastened to the rotor hub.

In view of the deficiencies and inefficiencies of the prior art, it would be desirable to have a method for setting pitch on a windmill rotor blade or airfoil which is safer, more accurate and more convenient than prior art methods.

SUMMARY OF THE INVENTION

Briefly stated, the present invention comprises a method for setting pitch on a windmill airfoil. The airfoil has a longitudinal axis and comprises a rotor blade and a rotor base secured to the rotor blade. A windmill rotor hub for receiving the rotor base is marked with a reference mark at a location corresponding to a first plane parallel to a plane of rotation of the windmill airfoil in use. The airfoil is positioned along a second plane relative to and substantially completely intersecting the longitudinal axis of the airfoil. The rotor base is marked at a location substantially parallel to the second plane. The airfoil is positioned relative to the windmill rotor hub so that the rotor base is in substantial engagement with the hub. The airfoil is moved relative to the windmill rotor hub so that the mark on the rotor base is aligned with the reference mark on the windmill hub. The rotor base is then secured to the windmill rotor hub.

The method of the present invention may also be used for marking pitch on a windmill airfoil by positioning the airfoil along a reference plane relative to and substantially completely intersecting the longitudinal axis and marking the rotor base proximate the periphery thereof at a location substantially intersecting the reference plane.

In addition, the present invention is directed to an apparatus for marking pitch on a windmill airfoil as described above. An airfoil rotor base has a surface which is interrupted by locating means indicating the geometric center thereof. The pitch marking apparatus comprises positioning means having a shape complementary to the locating means of the airfoil rotor base surface and referencing means attached to the positioning means for providing a substantially straight line of reference that intersects the geometric center of the rotor base surface of the airfoil.

BRIEF DESCRIPTION OF THE DRAWINGS

The foregoing summary of the invention, as well as the following detailed description of preferred embodiments, will be better understood when read in conjunction with the appended drawings. For the purpose of illustrating the invention, there is shown in the drawings embodiments which are presently preferred, it being understood, however, that the invention is not limited to the second methods and instrumentalities disclosed. In the drawings.

DESCRIPTION OF PREFERRED EMBODIMENTS

Figure 1:
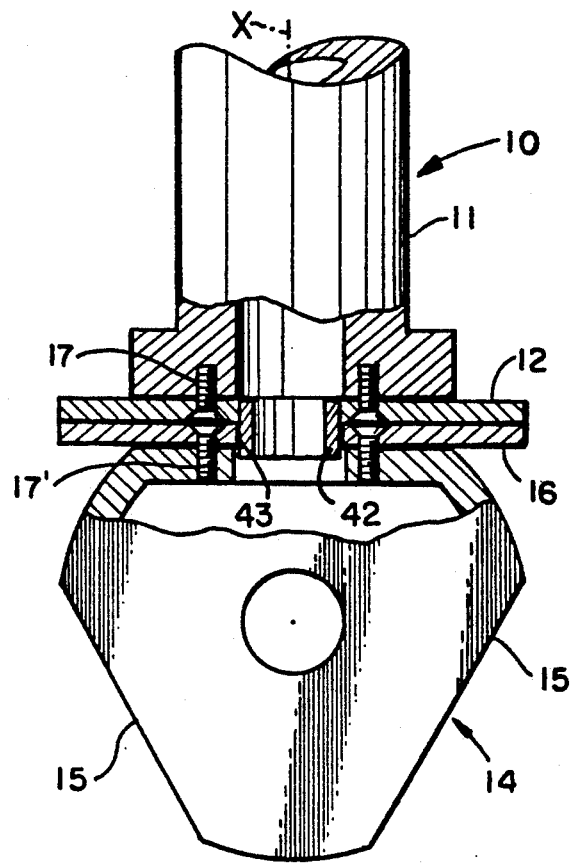
FIG. 1 is a partial cross-sectional view of a portion of a windmill airfoil and a portion of a windmill hub in accordance with/the present invention.

Referring to the drawings, wherein like numerals indicate like elements throughout, there is shown in FIG. 1 a partial cross-sectional view of a portion of a windmill airfoil 10 having a rotor blade 11 and a rotor plate or base 12 which may be integral with or, as shown in FIG. 1, secured to the rotor blade 11 using a plurality of bolts 17 or other suitable attaching means (not shown), such as adhesive or welding, where axis x indicates the longitudinal axis of the airfoil 10. As will be appreciated by one skilled in the art, the pitch of the airfoil 10 is determined by the position of the airfoil blade 11 or, more particularly, of a predetermined chord of the airfoil as it is rotated about the longitudinal axis x of the airfoil relative to the general wind direction (not shown), typically parallel to the horizon.

The rotor base is preferably flat and should be strong enough to not deform under loads typical in windmill use, causing loosening of the attaching means or change of pitch, among other undesirable consequences. A rotor base may alternatively include or be provided in the form of an extender or adapter 12' illustrated in FIG. 6 to extend the length of the airfoil where desired or to facilitate securing a particular airfoil to a particular windmill rotor hub where, for example, the airfoil and rotor hub are of different sizes or their respective securing means are mismatched. Where present, the adaptor 12' may be marked in the manner described below for marking the rotor base 12 in accordance with the present invention.

For purposes of illustrating the present invention, the windmill hub 14 is capable of supporting three windmill airfoils at typically equally spaced locations around the hub 14 (only one shown), although any number of rotor blades may be used. Examples of windmill rotors suitable for use in accordance with the present invention include the Aerostar rotor blade manufactured by Alternegy of Denmark and windmill rotor blades available from Solar Energy Research Institute of Golden, Colo.

Although not essential, as illustrated in FIG. 1, it may be desired to provide a hub base 16 which may be separable from the windmill rotor hub 14 to add weight to the windmill hub, provide a desired surface shape, or to act as an adaptor to facilitate securing a particular airfoil to a particular windmill rotor hub. The windmill hub base 16 may be secured to the windmill hub 14 using a plurality of bolts 17' or other suitable attaching means (not shown), such as adhesive or welding. Where present, the surface of the hub base 16 may be marked in the manner described below for marking the windmill rotor hub surface 15 in accordance with the present invention.

In accordance with the present invention, marks are made on a windmill rotor hub 14 and on a windmill airfoil rotor base 12 for referencing one to another to determine and set the desired pitch. The windmill rotor hub 14 generally has a number of surfaces 15 corresponding to the number of rotor blades or airfoils 10 used in the windmill apparatus. Each windmill hub surface 15 is preferably generally perpendicular to the plane of rotation of the hub 14 and is designed to engage and be secured to the rotor base 12 of a rotor blade 10. The hub 14 rotates in response to wind forces on the windmill rotor blades along a plane typically perpendicular to the horizon, although one skilled in the art will appreciate that other orientations are possible.

With reference to a given rotor blade 10, the windmill rotor hub 14 is marked with a reference mark at a location generally corresponding to a first plane which is generally parallel to the plane of rotation of the windmill airfoil in use. The plane of rotation of a windmill airfoil may be readily determined as being parallel to a disc brake rotor 40 typically present on modern windmill apparatus. One skilled in the art will appreciate that the disc brake rotor 40 rotates in a plane generally substantially parallel to the plane of rotation of the windmill rotor hub 14 and serves as a conventional reference plane. However, one skilled in the art will be able to recognize other methods of determining the plane of rotation of the windmill airfoil in use. Preferably, the windmill rotor hub 14 is marked along the hub surface 15 thereof with a reference mark or line 28 extending parallel to the first plane and, more preferably, intersecting the geometric center of the hub surface 15. Where the windmill rotor base surface 15 is substantially circular, for example, a reference line 28 extending through the geometric center of the surface defines a diameter of the hub surface 15. One skilled in the art will appreciate that a line substantially parallel to the first plane generally corresponds to 0° pitch relative to the plane of rotation of the windmill airfoil in use.

The airfoil 10 is positioned along a second plane preferably separate in location and orientation from the first plane. For ease and convenience in marking the airfoil 10, it is presently preferred that the second plane is substantially horizontal, although vertical and other plane orientations may be used in accordance with the present invention. The airfoil 10 is positioned along the second plane so that the second plane substantially completely intersects the longitudinal axis x of the airfoil 10. The airfoil 10 is then positioned or rotated so that the pitch of the airfoil is equal to the predetermined pitch desired relative to the second plane. Preferably, the airfoil is rotated about its axis x so that airfoil pitch is about 0° relative to the second plane.

Airfoil pitch may be determined relative to a given predetermined chord along the airfoil and relative to the second plane by using a chord line adaptor 50 having a top surface 52 and a bottom surface 54 having a shape complementary to the shape of an airfoil surface substantially perpendicular to the longitudinal axis of the airfoil at a given chord along the airfoil. The top surface 52 of the chord line adaptor 50 is substantially completely flat and is spaced from the bottom surface 54 so as to extend substantially parallel to the plane extending through the airfoil along the given chord. A bubble level (not shown) or other leveling device may be positioned on the top surface 52 of the adaptor, especially where the second plane is substantially horizontal, to assist alignment (rotation) of the airfoil about its longitudinal axis. One skilled in the art will appreciate in view of this disclosure that, especially where the airfoil is contoured and/or twisted, the flat top surface of the chord line adaptor provides a convenient reference surface with which to establish the pitch of the airfoil 10 relative to the second plane.

Alternative to rotating the airfoil 10 about its axis x to about 0° pitch, it may be desired to rotate the airfoil 10 to a different pitch relative to the second plane, which may be readily determined by one skilled in the art in view of this disclosure by, for example, measuring the arc offset of the top surface 54 of the chord line adaptor 50 from the second plane. Once rotated to the desired pitch, the surface 13, 13' of the rotor base 12, 12' of the airfoil 10 is then marked with a pitch mark or line 30 at a location substantially parallel to the second plane and preferably intersecting the longitudinal axis.

Figure 5:
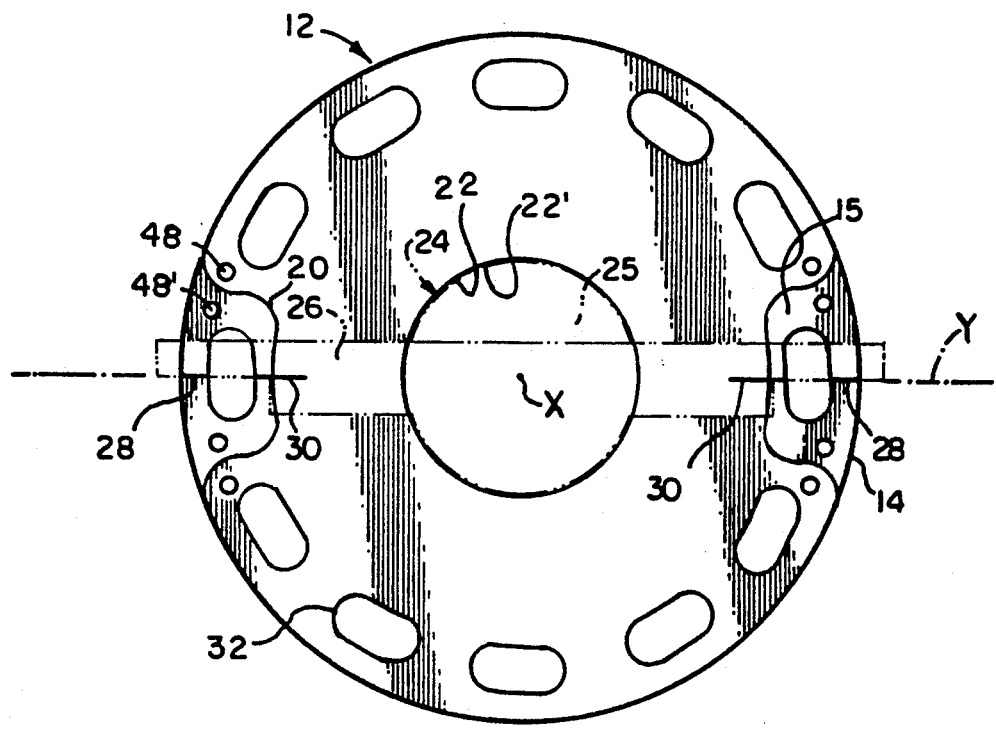
FIG. 5 is a end elevational view of a windmill airfoil base (without the airfoil) in engagement with a windmill hub plate (without the windmill hub) in accordance with the present invention.

With reference to FIG. 5, axis y corresponds to the second plane, and point x corresponds to the longitudinal axis x of the airfoil 10. In accordance with the present invention, it is presently preferred that the rotor base 12 is marked on a surface 13 preferably extending perpendicular to the longitudinal axis x with a pitch line 30 that intersects both the second plane (axis y) and the longitudinal axis x. In this way, pitch line 30 typically intersects the geometric center of the surface 13 of the rotor base 12 and, where the rotor base surface 13 is circular, defines a diameter thereof. Where the second plane is substantially horizontal, the pitch line 30 likewise extends substantially horizontally.

Once the windmill rotor hub 14 and the rotor base 12 have been marked, the airfoil 10 is positioned relative to the windmill rotor hub 14 so that the rotor base 12 is in substantial full engagement with the rotor hub 14. It is presently preferred to provide the surface 13 of the rotor base 12 with rotor indexing means 42 (not shown in FIG. 5) to help position the rotor base 12 in engagement with the windmill rotor hub 14 and to inhibit lateral movement of the windmill airfoil 10 with respect to the windmill rotor hub 14 while allowing rotational movement. Where the rotor indexing means 42 is present, the windmill rotor hub 14 or hub base 16 is provided with a windmill rotor hub locator 43 having a shape complementary to the rotor indexing means 42 to receive the indexing means and restrict lateral movement. In one presently preferred embodiment, in the drawings, the rotor indexing means 42 comprises a tube or pipe centrally attached to the rotor base 12 by welding or other attaching means and the windmill rotor hub surface 15 or hub base 16 is provided in its center with a circular hole therethrough as the locator 43 having an inner diameter sufficiently larger than the outer diameter of the indexing means to receive the indexing means 42 therein without substantial friction, which would inhibit rotational movement of the airfoil with respect to the windmill rotor hub, while not so large as to allow substantial lateral movement.

Figure 6:
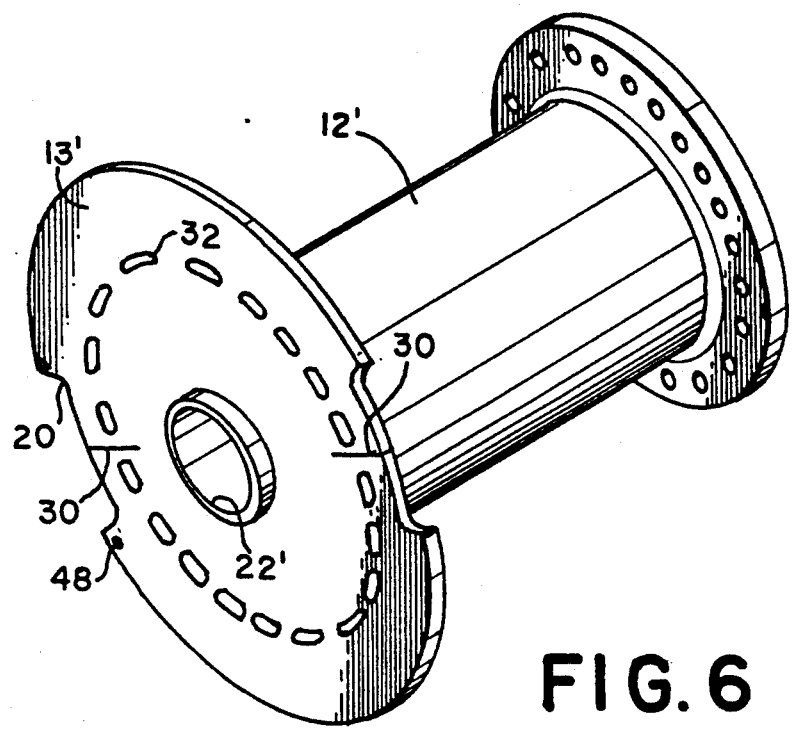
FIG. 6 is a perspective view of a second embodiment of a windmill airfoil base (without the airfoil) in accordance with the present invention.

Once located on the windmill motor hub, the airfoil 10 is then moved or rotated relative to the rotor hub 14 so that the pitch line 30 on the rotor base 12 is aligned with the reference line 28 on the rotor hub 14. To facilitate alignment of the rotor base and windmill rotor hub marks, it may be desired to extend the mark on the surface 13 of the rotor base 12, 12' to the side of the rotor base 12, 12' as illustrated in FIG. 6, especially where the mating surfaces (13, 13' and 15) of the rotor base 12, 12' and the rotor hub 14 would otherwise occlude the marks (28, 30) as the surfaces (13, 13' and 15) are brought into engagement. Further, it may be desired to provide the rotor base 12 with recesses or cutout areas 20 to allow visualization of the underlying windmill rotor hub 14 or hub plate 16 as best illustrated in FIG. 5. Once the marks are aligned, the airfoil 10 is secured to the windmill rotor hub 14 preferably by bolts (not shown) or other preferably removable securing means.

Where the pitch line 30 on the rotor base 12 and the reference line 28 on the windmill rotor hub 14 are precisely aligned and pitch line 30 corresponds to 0° pitch relative to the second plane, the airfoil 10 may be said to have a 0° pitch relative to the first plane. If 0° pitch is desired, the rotor base 12 may then be secured to the windmill rotor hub 14. If a different pitch is desired, before securing the rotor base 12 to the windmill hub 14, the airfoil 10 may be rotated about its longitudinal axis x and with respect to the hub 14 so that the pitch line 30 on the rotor base 12 is offset or spaced from the reference line 28 by a predetermined angular distance. The angular distance may be any degree at which pitch is desired but preferably about 0° to about 90°.

Figure 7:
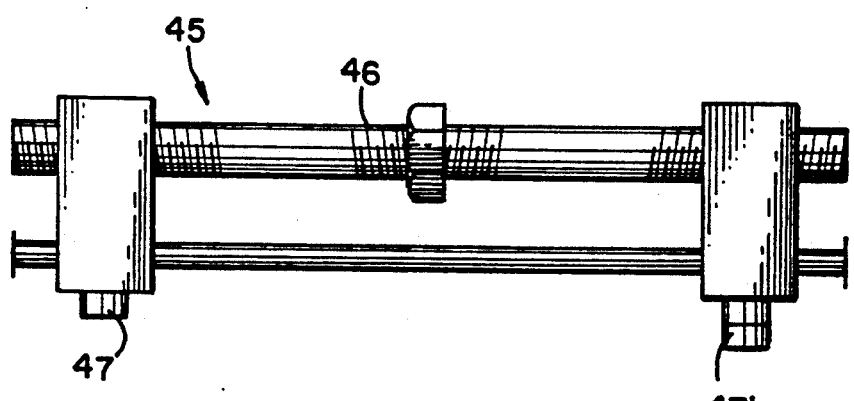
FIG. 7 is an side elevational view of a pitch adjusting apparatus in accordance with the present invention.
Figure 8:
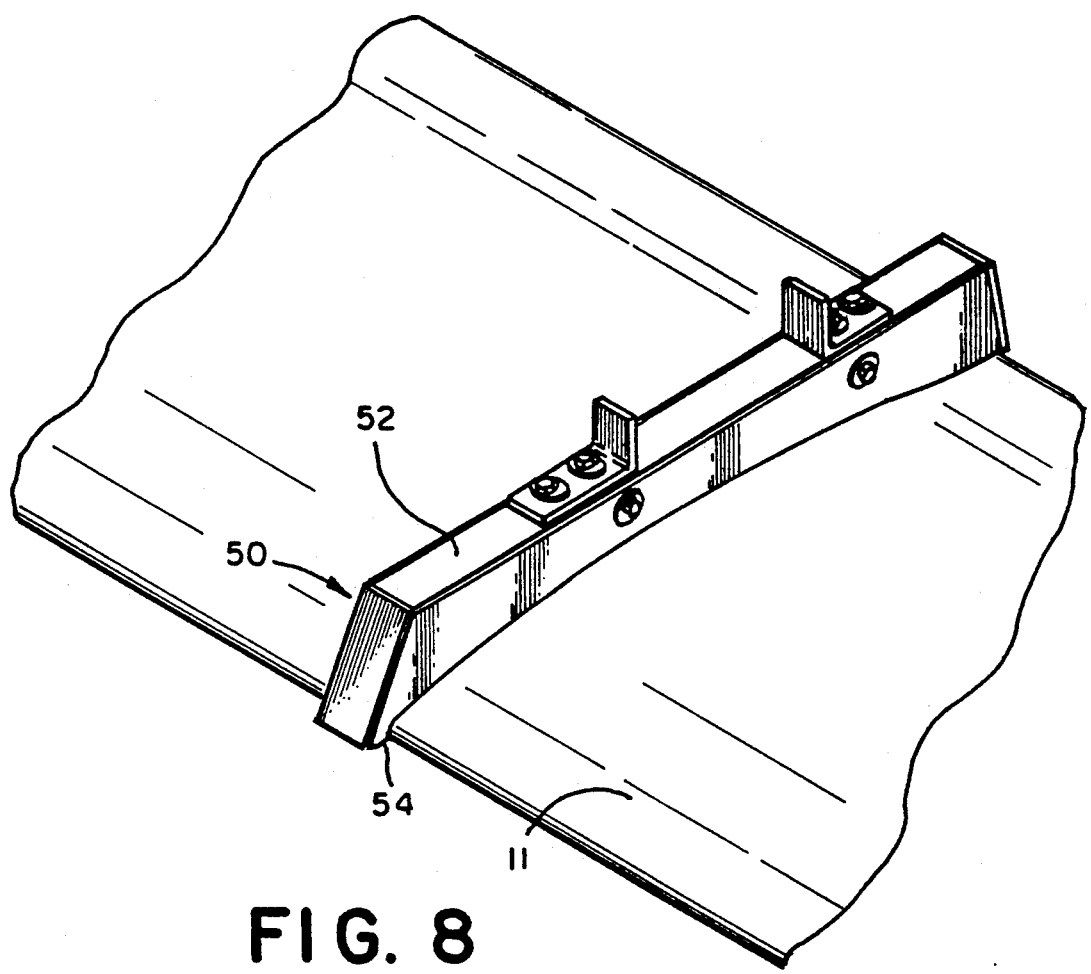
FIG. 8 is a side elevational view of a chord line adaptor positioned on a windmill airfoil in accordance with the present invention.

To facilitate alignment or offsetting of the marks and securing of the airfoil to the rotor hub, it is presently preferred to provide a pitch alignment tool 45 which cooperates with the rotor base 12 and the windmill rotor hub 14 to position the airfoil 10 as desired. As illustrated in FIG. 7, the pitch alignment tool 45 preferably comprises an adjuster 46 and first and second gripping means (47, 47'). In use, the first gripping means 47 is inserted into a first complementary index hole 48, for example, in the rotor base 12 and the second gripping means 47' is inserted into a second complementary index hole 48' in the windmill rotor hub 14. The adjuster means 46 is then rotated, causing the first and second gripping means (47, 47') to move farther away or closer together, depending on the direction the adjuster is rotated. It will be appreciated that the adjuster of the present invention provides leverage sufficient to rotate typically heavy rotor blades and provides a controlled rotation until the rotor blade can be secured to the windmill rotor hub.

To provide additional stability during pitch alignment, the rotor base 12 and/or rotor hub 14 may be provided with bolt holes (32, 32') which are generally elongated to allow for limited rotational movement of the airfoil 10 relative to the rotor hub 14 with bolts loosely in place until secured. One skilled in the art will appreciate in view of this disclosure that elongated holes (32, 32') allow freer range of rotation to accommodate a plurality of pitch settings.

One advantage of the method of the present invention is that the airfoil 10 need not be suspended or held in close proximity to its normal plane of rotation in use for purposes of setting or adjusting pitch. Rather, the airfoil 10 may be positioned horizontally as in, for example, storage or some stage of manufacture, for purposes of marking pitch for later assembly on the windmill in the field. Such assembly is simplified because accurate pitch may be determined by merely comparing reference line 28 with pitch line 30.

Figure 2:
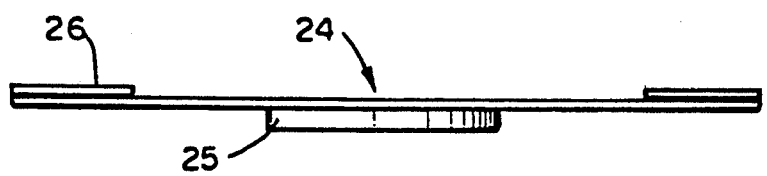
FIG. 2 is a side elevational view of a pitch marking apparatus in accordance with the present invention.
Figure 3:
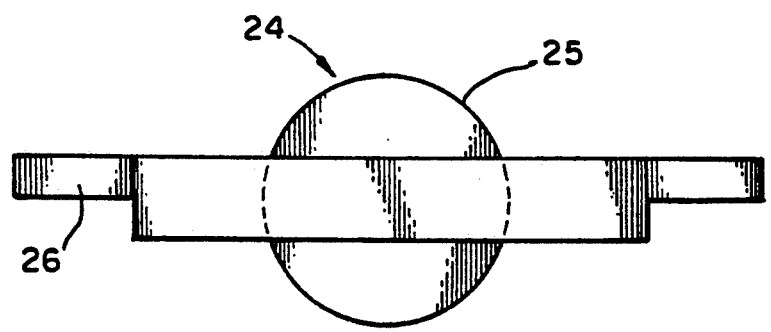
FIG. 3 is a top plan view of the pitch marking apparatus of FIG. 2.
Figure 4:
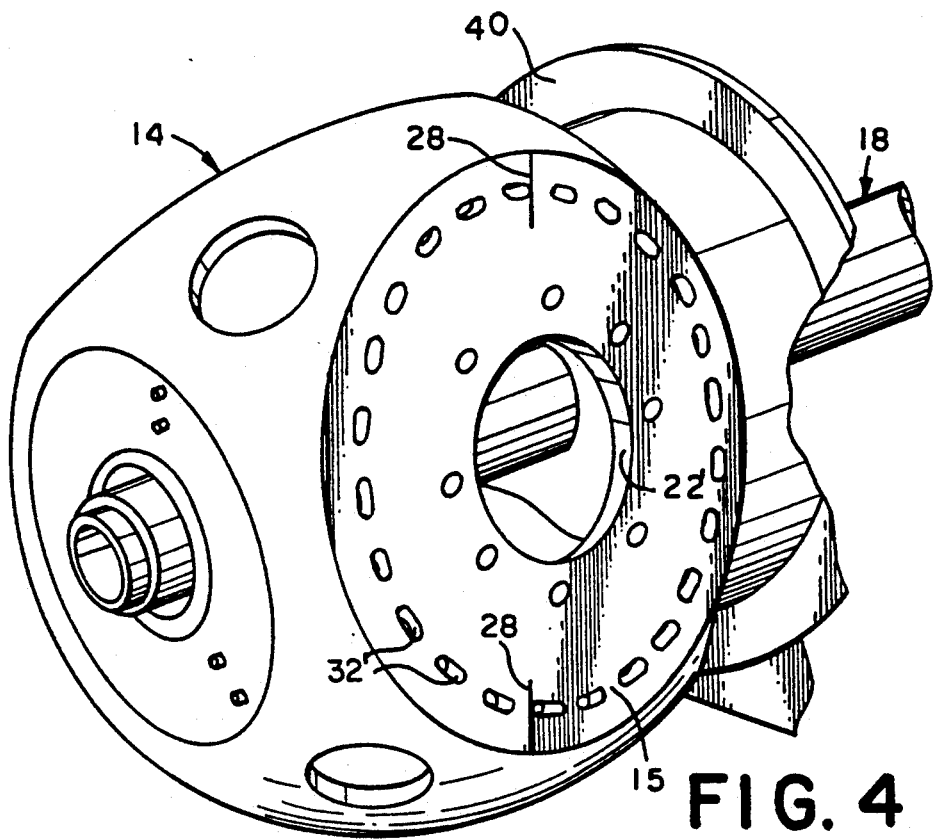
FIG. 4 is a perspective view of a windmill rotor hub in accordance with the present invention.

To facilitate the method of the present invention, it is presently preferred to interrupt the surface 15 of the windmill rotor hub 14 with locating means 22 indicating the geometric center of the surface and further providing the surface of the rotor base 12 with locating means 22' indicating the geometric center of the rotor base surface. These locator means (22, 22') may be the same as the rotor indexing means 42 and windmill rotor hub locator 43 discussed above. Pitch marking apparatus 24 (FIGS. 2 and 3) is provided with positioning means 25 having a shape complementary to the locating means 22 of the hub 14 and, generally on a second locating means, complementary to the locating 22' of the rotor base 12. The pitch marking apparatus 24 is also provided with referencing means 26 attached to the positioning means 25 for providing a substantially straight line of reference that intersects the geometric center of the rotor base 12 or 12' or the windmill hub 14.

In use with reference to the rotor base, as illustrated in FIG. 5, once the pitch of the airfoil 10 is determined relative to the second plane, the complementary positioning means 25 of the pitch marking apparatus 24 is inserted into or placed in substantial engagement with the locating means 22' of the rotor base 12 and the referencing means 26 is then aligned with the second plane for marking the surface 13 of the rotor base 12. Where the second plane is horizontal, the referencing means 26 of the apparatus 24 may be leveled horizontally using, for example, a bubble level or the like (not shown) to facilitate aligning the referencing means with the second plane. The pitch marking apparatus 24 is similarly used to mark the windmill rotor hub 14 in alignment with the first plane where the pitch marking apparatus 24 may further be provided with spacers (not shown) which extend to provide alignment reference with the disc brake rotor 40, where present. Where the locating means (22, 22') and the positioning means 25 are circular, the referencing means 24 defines a diameter of the circle, intersecting the geometric center thereof.

From the foregoing description, it can be seen that the present invention comprises a method for setting pitch on a windmill airfoil, where the desired pitch for the airfoil in use may be conveniently predetermined at a location apart from the windmill apparatus safely and precisely. It will be appreciated by one skilled in the art that changes could be made to the embodiments described above without departing from the broad inventive concept. It is understood, therefore, that this invention is not limited to the particular embodiments disclosed but it is intended to cover all modifications that are within the scope and spirit of the invention as defined by the appended claims.

I claim:

1. A method for setting pitch on a windmill airfoil, said airfoil comprising a rotor blade having a longitudinal axis and a rotor base secured to the rotor blade, the method comprising:
   (a) marking a windmill rotor hub having a hub surface for receiving the rotor base with a first reference mark line, said first reference mark line extending along a first plane, said first plane being generally parallel to a plane of rotation of the windmill airfoil in use;
   (b) positioning the rotor base of the airfoil along a second plane which extends generally parallel to the hub surface, said rotor base being separate in location and orientation from the first plane such that the second plane substantially completely intersects the longitudinal axis of the rotor blade of the airfoil;
   (c) marking a surface of the rotor base with a second reference mark line, said second reference mark line extending substantially parallel to the second plane,
   (d) positioning the airfoil relative to the windmill rotor hub so that the rotor base is in substantial engagement with the windmill rotor hub, thereby restricting lateral movement of the airfoil with respect to the rotor hub and allowing rotational movement of the airfoil with respect to the rotor hub;
   (e) rotating the airfoil relative to the windmill rotor hub so that the second reference mark line on the surface of the rotor base is aligned with the first reference mark line on the windmill rotor hub, thereby setting the pitch of the airfoil; and
   (f) securing the rotor base to the windmill rotor hub with said first and second reference mark lines in alignment with each other.

2. The method according to claim 1, further comprising after step (e) rotating the airfoil with respect to the windmill rotor hub so that the mark on the rotor base is spaced from the reference mark on the windmill motor hub by a predetermined angular distance.

3. The method according to claim 2, wherein the angular distance is about 0° to about 90°.

4. The method according to claim 1, wherein the windmill rotor hub is marked by a line extending along the hub surface and through a geometric center of the hub surface.

5. The method according to claim 4, wherein the hub surface of the windmill rotor hub extends along a plane substantially perpendicular to the first plane.

6. The method according to claim 5, wherein the windmill rotor hub surface is substantially circular and the hub is marked by a line defining a diameter of the circular hub surface.

7. The method according to claim 1, wherein the rotor base surface extends essentially transverse to the longitudinal airfoil axis and the reference mark on the surface of the rotor base extends along the rotor base surface and through a geometric center of the rotor base surface.

8. The method according to claim 7, wherein the rotor base surface is substantially circular and is marked by a line defining a diameter of the circular base surface.

9. The method according to claim 1, wherein the first plane is substantially vertical.

10. The method according to claim 1, wherein the second plane is substantially horizontal.

11. The method according to claim 1, wherein the hub surface of the windmill rotor hub and the surface of the rotor base each is interrupted by locating means indicating a geometric center of each surface and the rotor base and the hub are marked in steps (a) and (c) using a pitch marking apparatus, said apparatus comprising positioning means having a shape complementary to the locating means of the windmill rotor hub or rotor base and referencing means attached to the positoning means of the apparatus for providing a substantially straight line of reference that intersects the geometric center of the rotor base or windmill rotor hub.

12. The method according to claim 1, wherein in step (e), the airfoil is moved relative to the windmill rotor hub using pitch alignment apparatus comprising first gripping means for gripping a first complementary index means on the rotor base, second gripping means for gripping a second complementary index means on the windmill rotor hub, and adjacent mean for causing the first gripping means to move farther away or closer to the second gripping means.

13. The method according to claim 12, wherein in step (d) said airfoil rotor base is provided with rotor indexing means and said windmill rotor hub is provided with a locator having a shape complementary to the rotor indexing means to receive the rotor indexing means and restrict lateral movement therebetween while allowing rotational movement of the airfoil with respect to the windmill rotor hub.

* * * * *